United States Patent [19]
Han

[11] Patent Number: 5,724,826
[45] Date of Patent: Mar. 10, 1998

[54] OUTSIDE AIR CONDITIONER UNIT WITH A CONTROLLER FOR VARYING THE INTENSITY OF AIR FLOW

[75] Inventor: Geun Phil Han, Incheon-city, Rep. of Korea

[73] Assignee: Samsung Electronics Co., Ltd., Suwon, Rep. of Korea

[21] Appl. No.: 574,144

[22] Filed: Dec. 18, 1995

[30] Foreign Application Priority Data

Dec. 16, 1994 [KR] Rep. of Korea .............. 94-34686

[51] Int. Cl.[6] ..................... F25B 39/04; F01D 25/24
[52] U.S. Cl. ............................... 62/183; 415/126
[58] Field of Search ................. 62/183, 181, 428, 62/455; 415/126–127

[56] References Cited

U.S. PATENT DOCUMENTS 3,449,922  6/1969  Ruff et al. .................. 62/183

FOREIGN PATENT DOCUMENTS 1091786  12/1980  Canada .................. 62/183

*Primary Examiner*—William E. Wayner
*Attorney, Agent, or Firm*—Burns, Doane, Swecker & Mathis, L.L.P.

[57] ABSTRACT

An outside air conditioner unit includes a heat exchanger for conducting refrigerant, and a fan for circulating outside air across the heat exchanger. The fan is disposed coaxially within a hollow cylinder which can be adjusted axially relative to the fan by a motor to vary the intensity of the air flow. The fan motor is connected to a controller which actuates the motor in response to a difference between outside air temperature and a reference temperature to reduce the air flow intensity when the heat exchanger is in an overload condition.

7 Claims, 8 Drawing Sheets

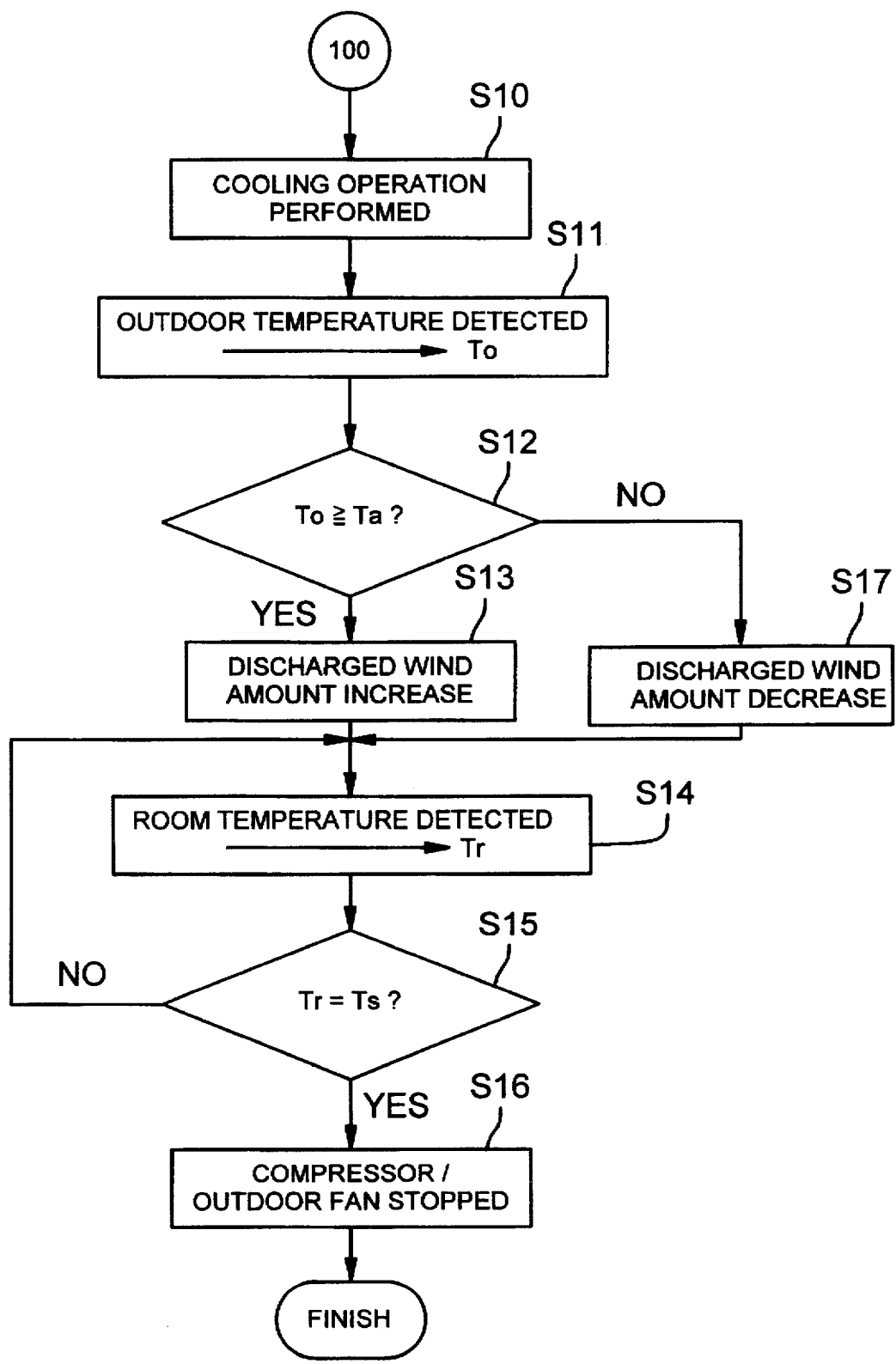

OUTSIDE AIR CONDITIONER UNIT WITH A CONTROLLER FOR VARYING THE INTENSITY OF AIR FLOW

BACKGROUND OF THE INVENTION

1. Field of the Invention

The present invention relates to an outside air conditioner unit of the type comprising a heat exchanger for circulating a refrigerant, and a fan for directing outside air across the heat exchanger.

2. Description of the Prior Art

As a prior art, Japanese laid open Utility model application No. Sho. 58-188563 is disclosed.

An outdoor unit of an air conditioner disclosed in the Japanese application, as illustrated in FIGS. 1 and 2, is formed with a suction inlet 2 on one side wall 1A of a body 1 thereof and a rear wall 1B, and is provided with a discharge outlet 3 for-discharging the air absorbed through the suction inlet 2 and heat-exchanged 4 by a heat exchanger (described later).

The outdoor heat exchanger 4 is arranged at an inner side of the walls 1A, 1B for heat-exchanging the air absorbed through the suction inlet 2 by way of latent heat, and is provided at an inner side of the discharging outlet 3 with an outdoor blowing fan 5 mounted on a rotary axis of a fan motor 6 in order to draw air through the suction inlet 2 to cool the refrigerant in the outdoor heat exchanger 4 and at the same time to discharge the air outside of the body 1 thereof.

Furthermore, the discharging outlet 3 is provided at a periphery thereof with guide means 7 for guiding the air discharged therethrough, and the body 1 of the outdoor unit is equipped at one inner side thereof with a compressor 8 for compressing refrigerant to high pressure and high temperature.

In the air conditioner thus constructed, when a user selects a desired temperature by manipulating switches mounted on a control panel of an indoor unit (not shown) and activates an operation switch, an indoor fan mounted at the indoor unit (not shown) is driven and at the same time, detects changing temperatures by way of temperature detecting means to thereby output the same to a controller.

The controller serves to compare the present room temperature detected by the temperature detecting means with a desired temperature data established by the user.

As a result of the comparison thereof, the operating frequency of the compressor 8 and speed of the outdoor fan 5 are determined according to a difference between the room temperature and the desired temperature, thereby causing the compressor 8 and the outdoor fan 5 to be operative.

When the compressor 8 is rendered operative, the refrigerant compressed to a gaseous state of high temperature and high pressure by the compressor 8 is infused into the outdoor heat exchanger 4, which serves to cool the gaseous refrigerant to liquid refrigerant of low pressure and low temperature.

At this time, outside air drawn into the body 1 of the outdoor unit through the suction inlet 2 by the outdoor fan 5 serves to cool the refrigerant of the outdoor heat exchanger 4, and the refrigerant of low pressure and low temperature liquefied in the outdoor heat exchanger 4 is reduced in pressure and temperature through an expansion valve before being conducted into an indoor heat exchanger (not shown).

Accordingly, the indoor heat exchanger receives the gaseous refrigerant of lower pressure and low temperature and evaporate same through a plurality of pipes, to thereby discharge the cooled air (cool wind) indoors for an indoor cooling.

Furthermore, the gaseous refrigerant of lower pressure and low temperature heated by the indoor heat exchanger flows into the compressor 8.

On the other hand, in case of heating, the refrigerant flows via a cooling cycle formed by the compressor 8, indoor heat exchanger (not shown), expansion valve (not shown), outdoor heat exchanger 4, and compressor 8, so that the operation can be performed.

However, there is a problem in that the inner edge of the guide means 7 of the outdoor unit 1 forms a fixed angle (0) relative to an axis of the outdoor fan 5, so that wind intensity discharged from the discharging outlet 3 becomes constant, thereby resulting in heavy unpleasant noises.

Furthermore, there is another problem in that no adequate counter measures are available for variable lead conditions at the compressor 8 and the outdoor heat exchanger 4 according to changing room temperatures, to deal with an increase in the consumed electricity resulting from a decrease of cooling and heating efficiencies.

SUMMARY OF THE INVENTION

The present invention is therefore disclosed to solve the afore-said problems and it is an object of the present invention to provide an air conditioner which can control the intensity of the air discharged from an outdoor unit according to changing outdoor temperatures to thereby improve cooling and heating efficiencies.

It is another object of the present invention to provide an air conditioner which can control the intensity of the air discharged from an outdoor unit to thereby reduce frictional noises generating in the course of operations of an outdoor fan and a fan motor during the night or an occasion calling for silent operation.

In accordance with the objects of the present invention, there is provided an air conditioner, the air conditioner comprising:

outdoor temperature detecting means for detecting outdoor temperature (To);

control means for discriminating load conditions of an outdoor heat exchanger according to the outdoor temperature (To) detected by the outdoor temperature detecting means to thereby control overall operations;

discharged wind amount control means for receiving a control signal output from the control means according to the outdoor temperature (To) detected by the outdoor temperature detecting means to thereby control intensity of the air discharged through a discharging outlet of an outdoor unit;

a wind amount control motor for advancing and reversing the discharged wind amount control means;

driving means for driving the wind amount control motor according to a control signal output from the control means;

blowing means for discharging the air heat-exchanged at the outdoor heat exchanger through the discharged wind amount control means; and outdoor fan motor driving means for driving the blowing means according to the control signal output from the control means.

The air conditioner according to the present invention thus constructed serves to heat-exchange the air absorbed from a suction inlet according to activation of a fan in a discharging outlet at an outdoor unit and to advance and to reverse the discharged wind amount control means for smoothly discharging the same at the discharging outlet according to activation of a wind amount control motor, so that an angle of incidence can be controlled in size thereof to thereby control discharged amount of the air heat-exchanged at an outdoor heat exchanger for reduction of noises in the night or on the occasion calling for silent operation of the air conditioner.

BRIEF DESCRIPTION OF THE DRAWINGS

For a better understanding of the nature and objects of the invention, reference should be made to the following detailed description taken in conjunction with the accompanying drawings in which:

FIGS. 9A and 9B are flow charts for illustrating operational procedures of an air conditioner accordingly to the present invention.

DETAILED DESCRIPTION OF A PREFERRED EMBODIMENT OF THE INVENTION

The embodiment of the present invention will now be described in detail according to the accompanying drawings.

Figure 1:
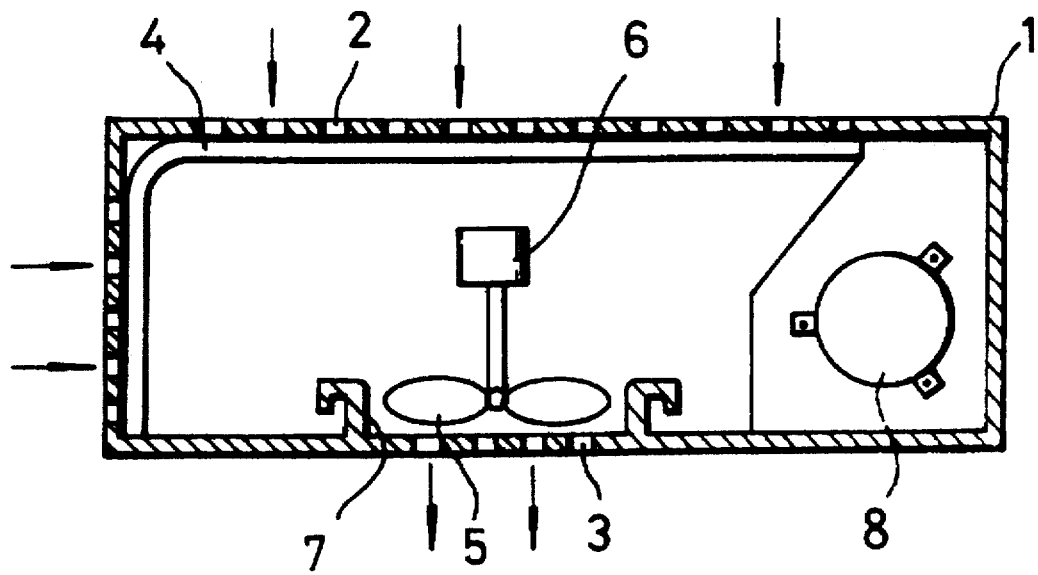
FIG. 1 is a sectional view for illustrating an assembled construction of a prior art outdoor unit of an air conditioner.
Figure 2:
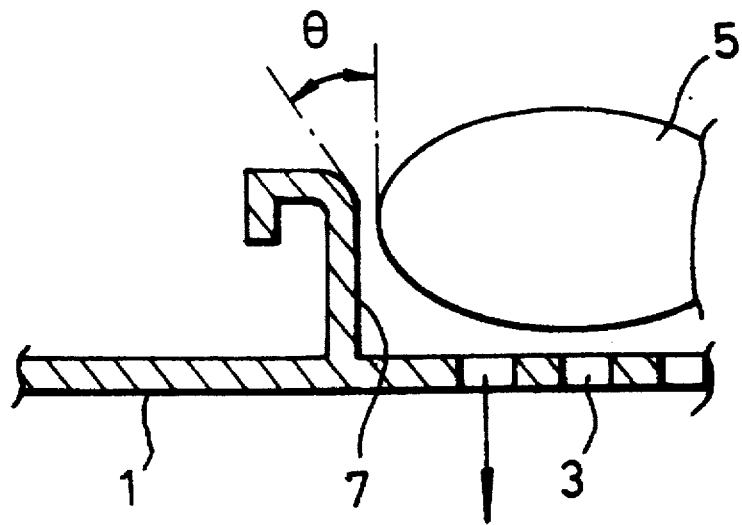
FIG. 2 is an enlarged sectional view for illustrating a portion of the unit depicted in FIG. 1.
Figure 3:
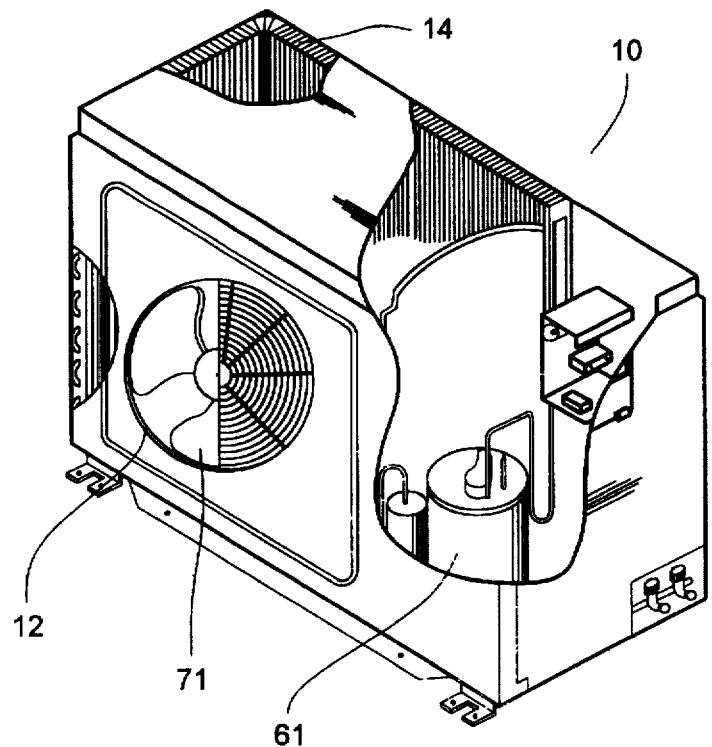
FIG. 3 is a schematic perspective diagram for illustrating an outdoor unit of an air conditioner according to the present invention.
Figure 4:
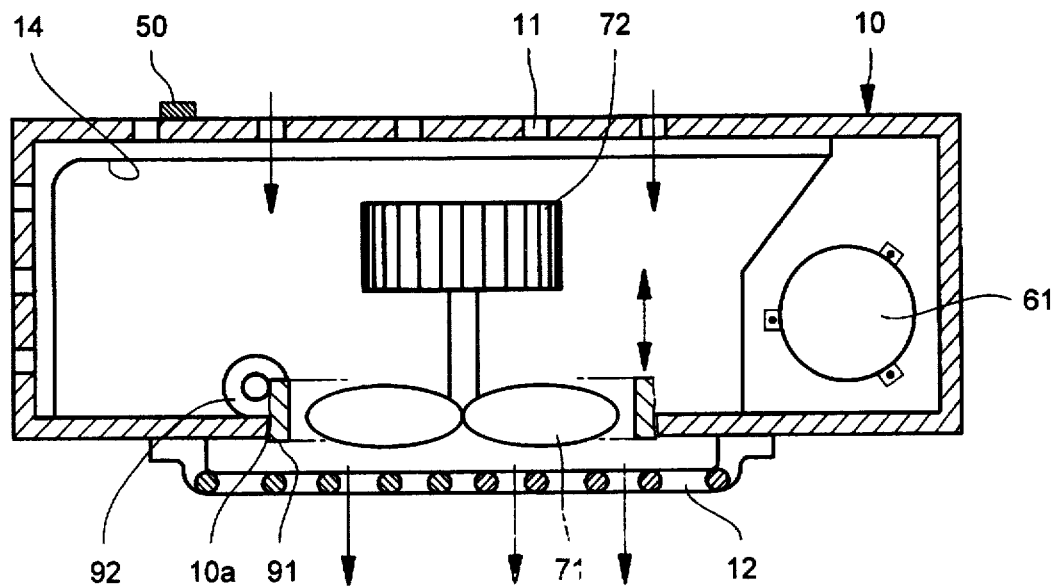
FIG. 4 is a sectional view through the air conditioner depicted in FIG. 3.

Reference numeral 10 in FIGS. 3 and 4 is a body of an outdoor unit. The body 10 is formed at a rear surface thereof with a suction inlet 11 for conducting outdoor air thereinto according to rotation of a fan 71 disposed on a rotary axis A of a fan motor 72 at the outdoor unit.

The body 10 is frontally provided with a discharging outlet 12 for discharging the air outside after heat-exchanging the same.

The suction inlet 11 is provided on an external side thereof with a temperature sensor 50 for detecting the temperature (To) of the outside air sucked therethrough, and along an overall inner surface thereof there is mounted an outdoor heat exchanger 14 for heat-exchanging the air with refrigerant to thereby cool the refrigerant.

The discharging outlet 12 is provided at an inner side thereof with wind control means 91 for guiding a flow of the air heat-exchanged at the outdoor heat exchanger 14 and for controlling the amount of the air flow, and is also connected to a wind amount control motor 92 for displacing the control means 91.

Figure 5:
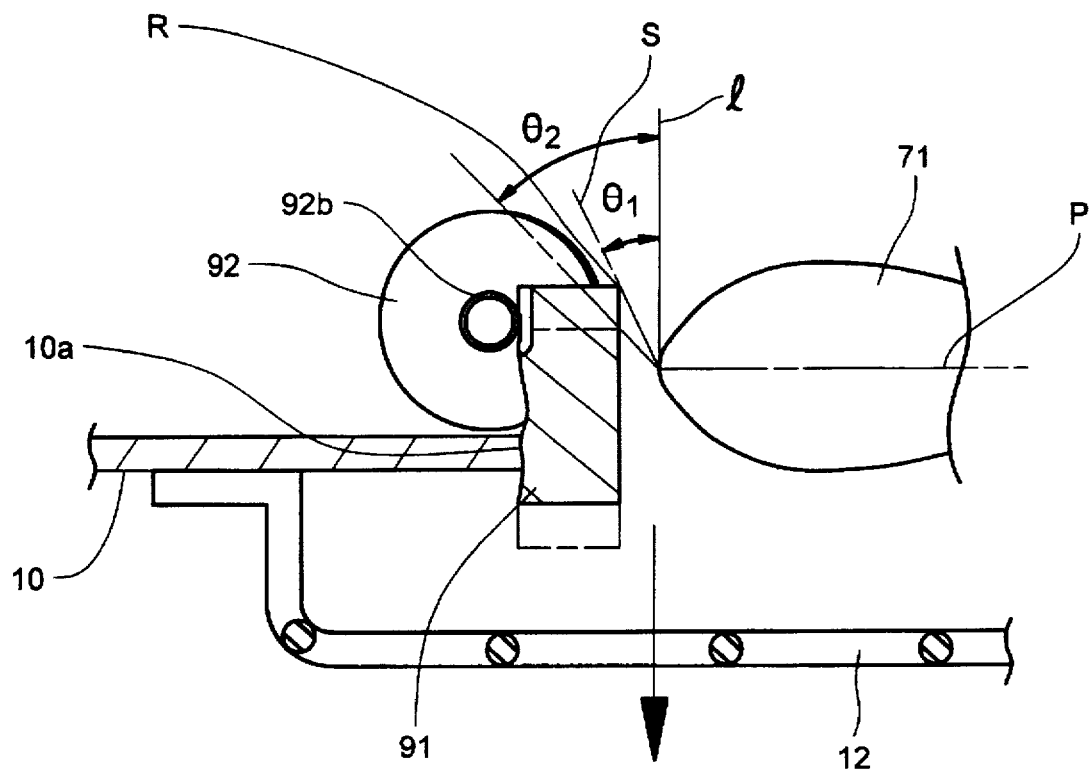
FIG. 5 is an enlarged sectional view for illustrating a portion of the unit depicted in FIG. 4.
Figure 6:
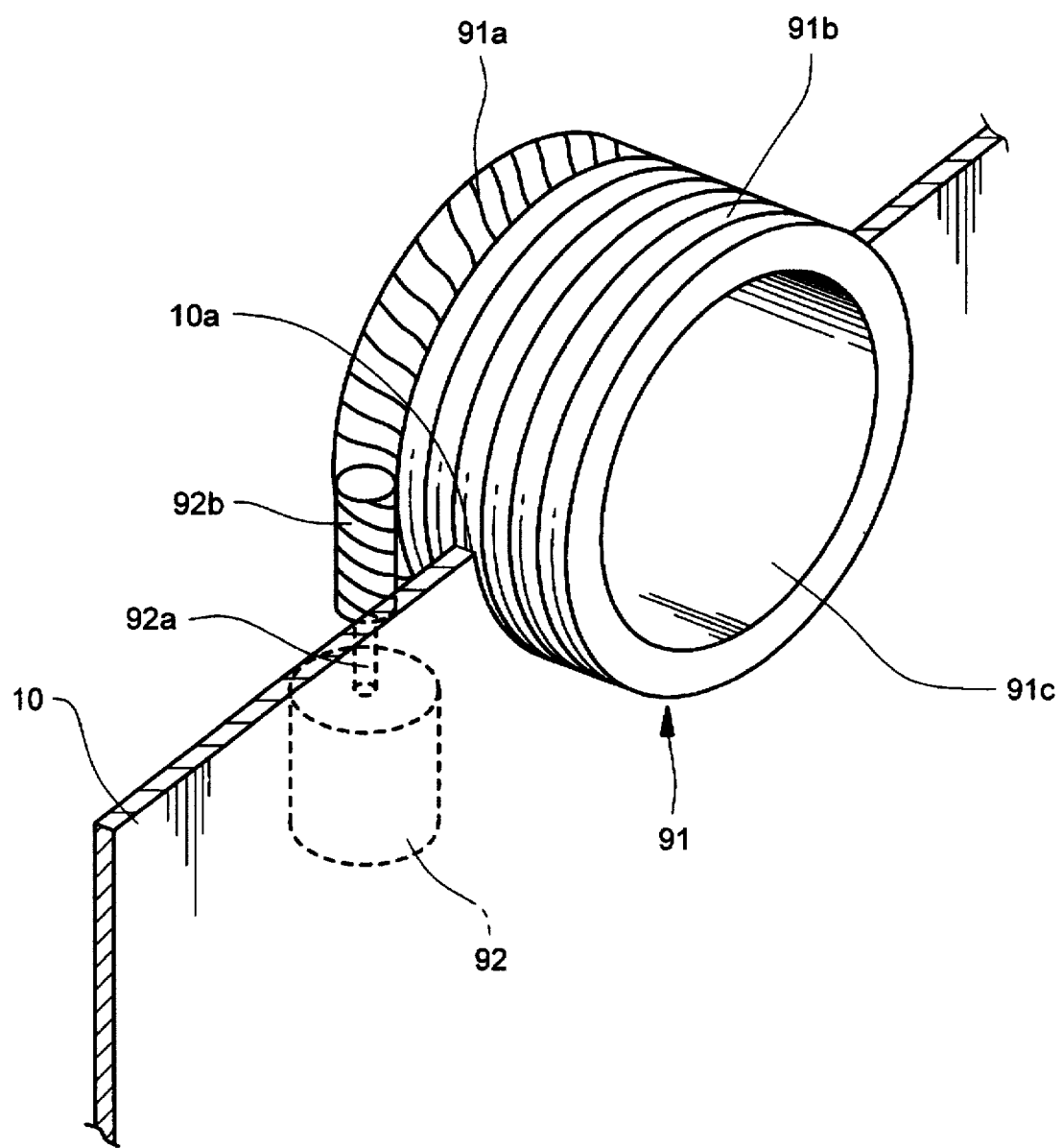
FIG. 6 is a perspective view for illustrating a portion of the unit depicted in FIG. 4.

The control means 91 has a cylindrical shape, and is formed at a periphery thereof with a worm wheel 91a engaged with a worm mounted on a rotary axis 92a of the wind amount control motor 92, as illustrated in FIGS. 4, 5 and 6. The control means 91 is coaxial relative to the axis A of the fan 71, and is also formed with a thread unit of spiral shape meshed with an opening 10a provided at a front wall of the body 10 so as to axially displace the control means 91 according to rotation of the worm wheel 91a. The control means 91 is provided with an inner passage 91c for receiving the fan 71 and discharging the air heat-exchanged at the outdoor heat exchanger 14.

Next, a cooling and heating operation control apparatus of an air condition thus constructed will be described with reference to FIG. 8.

Figure 8:
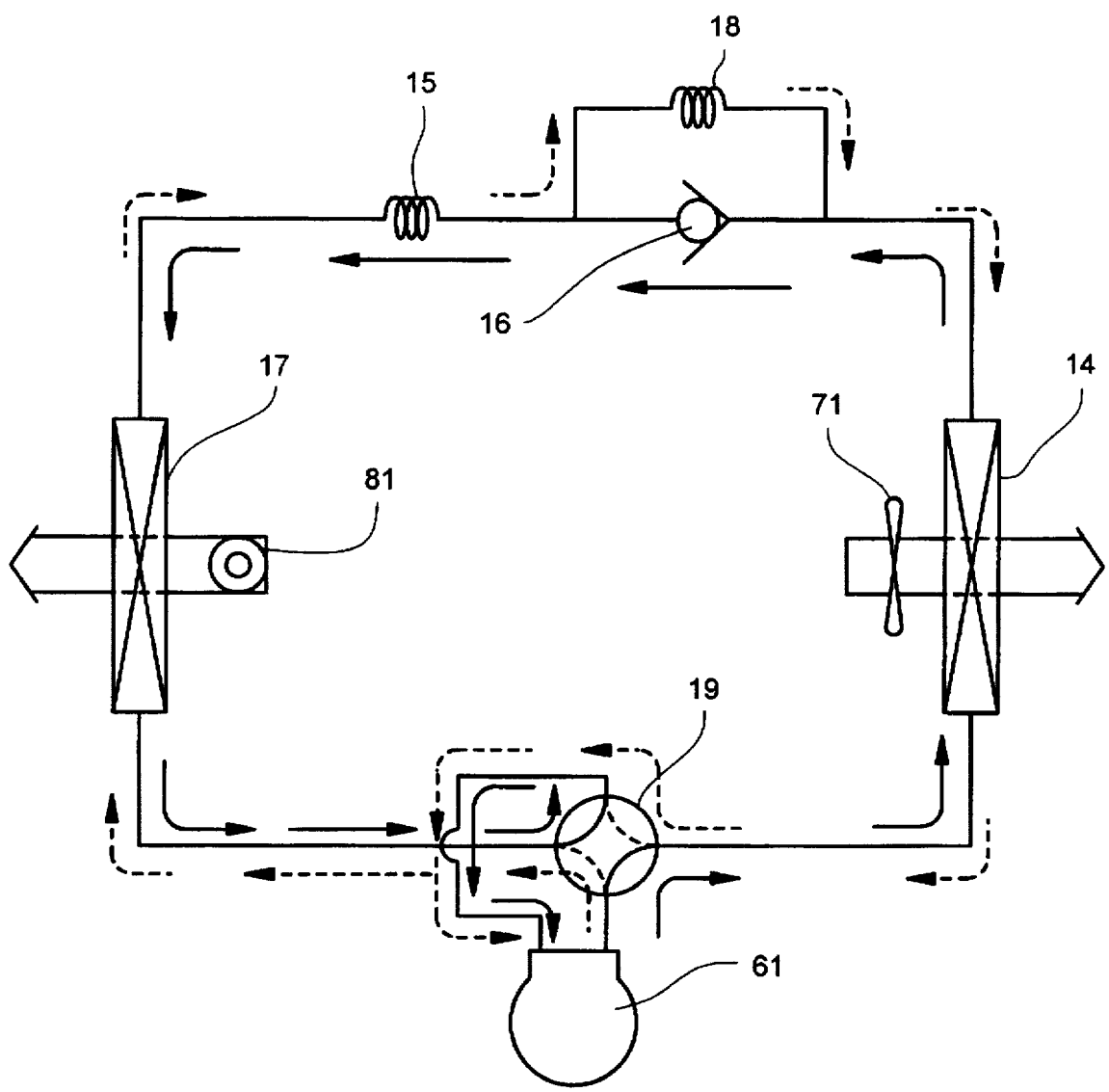
FIG. 8 is a block diagram for illustrating cooling and heating cycles in an air conditioner according to the embodiment of the present invention.

FIG. 8 is a block diagram for illustrating cooling and heating cycles in the air conditioner according to the embodiment of the present invention.

Figure 7:
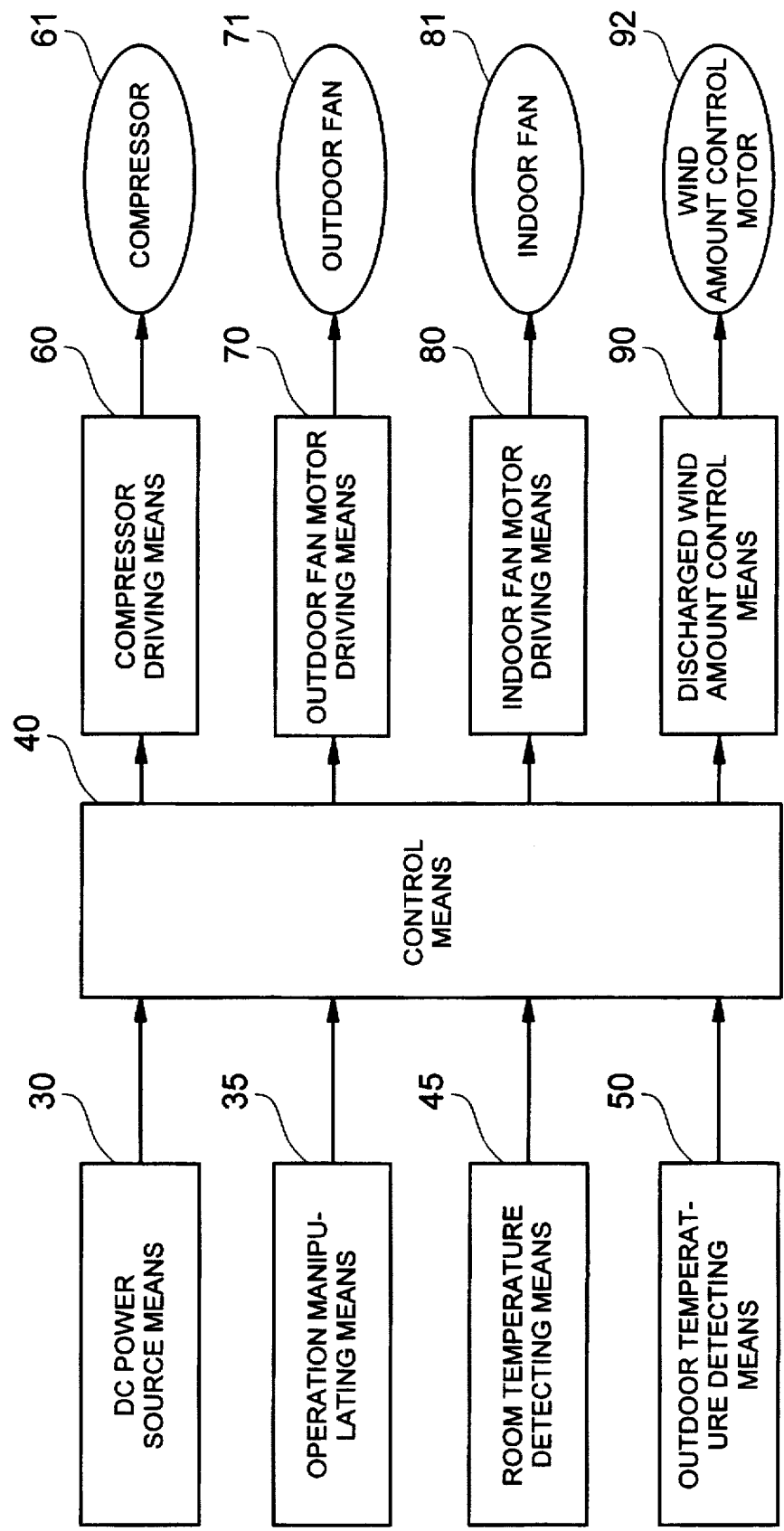
FIG. 7 is a control block diagram of an air conditioner according to the embodiment of the present invention.

In FIGS. 7-8, direct current DC power source means 30 serves to receive a commercial alternating current AC supplied from an AC power source input terminal (not shown) to thereby convert the same to a predetermined DC voltage necessary for operation of the air conditioner and to output the same. Operation manipulating means 35 serves to establish operating conditions such as heating, cooling, humidifying, blowing operation and the like desired by the user, and desired temperature (Ts), time, wind amount, wind direction and the like. The operation manipulating means 35 is control means or a remote controller disposed at a control panel of the air conditioner and provided with a plurality of functional keys (or buttons).

Control means 40 is a microcomputer which serves to receive DC voltage output from the DC power source means 30 to thereby initialize the air conditioner and at the same time to control overall operations of the air conditioner according to the operating conditions input by the operation manipulating means 35.

The control means 40 also serves to discriminate load conditions of a compressor 61 and the outdoor heat exchanger 14 according to the outdoor temperature (To) detected by outdoor temperature detecting means (described later) to control the wind amount of the air discharged through the discharging outlet 12, so that rotary speed of the outdoor fan 71 (to be specific, rotary speed of the fan motor 72) of the outdoor fan 71 and at the same time, revolution of the wind amount control motor 92 for driving the control means 91 can be controlled.

The control means 40 is pre-stored at a read only memory ROM table with data about discharged wind amount and noise level according to an angle θ1 or θ2 (for convenient sake, incident angle) made by a line (S) and a tangent (l) perpendicularly crossing a vane center line (P) of the outdoor blowing fan 71. The line S extends from the point of intersection of lines l and P and passes through an inner peripheral edge (R) of the control means 91.

Furthermore, indoor temperature detecting means 45 serves to control the room temperature at a temperature established by the user according to the operation manipulating means 35, so that a temperature (Tr) of room air sucked through the suction inlet of the indoor unit (not shown) can be detected to control cooling and heating operations of the air conditioner, and the detected room temperature data (Tr) can be output to the control means 40.

Outdoor temperature detecting means 50 serves to detect the temperature (To) of the outdoor air admitted through the suction inlet 11 of the outdoor unit and output the outdoor temperature data (To) to the control means, so that the amount of the air discharged through the discharge outlet 12 can be adjusted to thereby control noise.

Furthermore, compressor driving means 60 serves to controllably drive a compressor 61 to perform indoor heating and cooling operations according to the operating frequency determined by the control means 40 and according to a difference between a temperature (Ts) established by the user at the operation manipulating means 35 and a room temperature (Tr) detected by the indoor temperature detecting means 45.

Outdoor fan motor driving means 70 serves to controllably drive the outdoor fan motor 72 so that the air heat-exchanged at the outdoor heat exchanger 14 can be blown out according to the rpm determined by the control means 40 and according to a difference between the temperature (Ts) established by the user at the operation manipulating means 35 and the room temperature (Tr) detected by the room temperature detecting means 45.

Indoor fan motor driving means 80 serves to controllably drive an indoor fan 81 by controlling the rpm of an indoor fan motor so that the air (cool wind or hot wind) heat-exchanged at the indoor heat exchanger (not shown) at the indoor unit can be blown indoors according to an established wind amount selected by the user at the operation manipulating means 35.

Motor driving means 90 serves to drive the control motor 92 so that the discharged wind amount from the discharge outlet 12 can be adjusted by controlling a control signal output from the control means 40 according to the outdoor temperature (To) detected by the outdoor temperature detecting means 50.

Now, the operation of the air conditioner thus constructed will be described with reference to FIGS. 8, 9A and 9B.

Figure 9A:
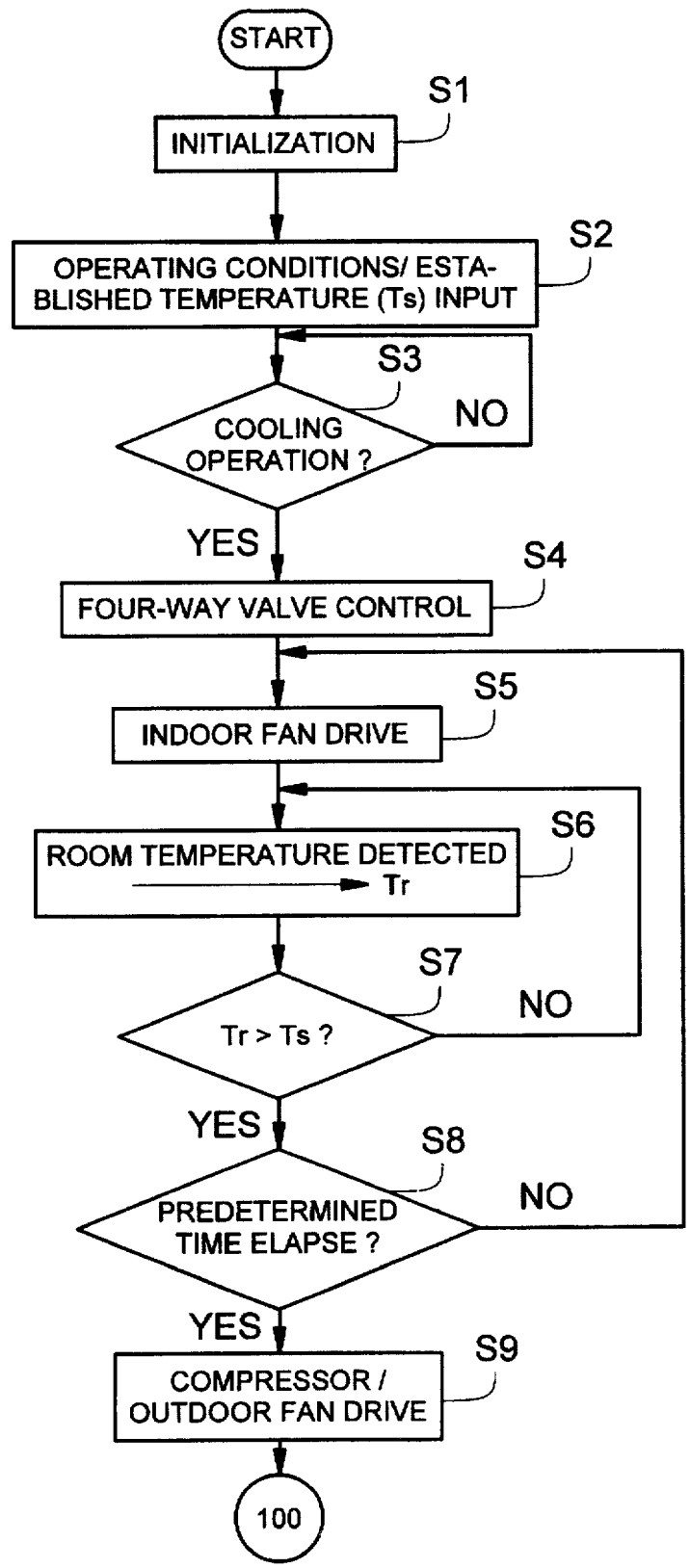

FIG. 8 is a block diagram for illustrating cooling and heating cycles in an air conditioner, and FIGS. 9A and 9B are flow charts for illustrating operational procedures of an air conditioner according to the present invention, where reference symbol "S" denotes steps.

First of all, when electric power is applied to the air conditioner, the DC power source means 30 serves to convert commercial AC power supplied from an input terminal (not shown) to a predetermined DC voltage necessary for driving the air conditioner, to thereby output the same to respective driving circuits and the control means 40.

Accordingly, at step S1, the control means 40 receives the DC voltage output from the DC power source means 30 to thereby initialize the air conditioner, and at the step S2, the operating conditions such as cooling, heating, blowing operation and the like, the established temperature (Ts) and the indoor discharged wind amount are input to the control means 40.

Successively, at step S3, a discrimination is made as to whether or not the operating condition input by the operation manipulating means 35 is "cooling operation mode" and if it is not "the cooling operation mode" (in case of NO), the discrimination performed at step S3 is repeatedly executed.

As a result of the discrimination at step S3, if the operating condition input by the operation manipulating means 35 is "cooling operation mode" (in case of YES), flow advances to step S4, where a four-way valve for performing the cooling operation is set for the cooling operation.

At this time, the refrigerant flows according to an arrow head through a cycling loop which is formed by the compressor 61, four-way valve, outdoor heat exchanger 14, check valve 16, expansion valve 15, indoor heat exchanger 17, four-way valve, and compressor 61.

Next, at step S5, the control means 40 serves to output a control signal to the indoor fan motor driving means 80, which, in turn, receives the control signal output from the control means 40 according to the established wind amount input by the operation manipulating means 35 to thereby drive and control the rpm of the indoor fan motor 81.

When the indoor fan 81 is driven according to the established wind amount, room air is drawn into the body of the indoor unit through the suction inlet of the indoor unit (not shown).

As step S6, the temperature (Tr) of room air drawn through the suction inlet of the indoor unit is detected by the room temperature detecting means 45 and is output to the control means 40.

At step S7, a discrimination is made as to whether or not the room temperature (Tr) detected by the room temperature detecting means 45 is larger than the established temperature (Ts) input by the operation manipulating means 45, and if it is discriminated that the room temperature (Tr) is not larger than the established temperature (Ts) (in case of NO), flow returns to step S6 because there is no need for cooling the room, and the room temperature (Tr) is continuously detected and operations subsequent to step S6 are repeatedly performed.

As a result of the discrimination at step S7, if it is discriminated that the room temperature (Tr) is larger than the established temperature (Ts) (in case of YES), there is a need for cooling the room, so that, at step S8, a discrimination is made as to whether a predetermined period of time (delaying time for protecting the compressor: approximately 3 minutes) has lapsed after the driving of the indoor fan 81 at step S5, and if the predetermined time has not lapsed (in case of NO), flow returns back to step S5 and drives only the indoor fan 81 until the predetermined period of time lapses.

As a result of the discrimination at step S8, if it is discriminated that the predetermined period of time has lapsed (in case of YES), it can be considered that there is no problem in driving the compressor 61 because of constant electric consumption, so that, at step S9, the control means 40 determines the operating frequency of the compressor 61 according to the difference between the room temperature (Tr) and the established temperature (Ts), to thereby output to the compressor driving means 60 a control signal for driving the compressor 61 according to the operating frequency determined by the control means 40.

At the same time, the control means 40 serves to determine the rpm of the outdoor fan 71 according to the difference between the room temperature (Tr) detected by the room temperature detecting means 45 and the established temperature (Ts) established by the user at the operation manipulating means 35 and output a control signal to the outdoor fan motor driving means 70, thereby controlling the rpm of the outdoor fan motor 72.

When the compressor 61 and the outdoor fan 71 are driven as apparent from the foregoing, the refrigerant compressed to a gaseous state of high temperature and high pressure by the compressor 61 is infused at step S10 into the outdoor heat exchanger 14 through the four-way valve 19, and the outdoor heat exchanger 14 serves to heat-exchange the gaseous refrigerant of high pressure and high temperature with the air blown by the outdoor blowing fan 71, to cool and liquify the refrigerant.

The refrigerant of high pressure and low temperature liquefied by the outdoor heat exchanger 14 passes through the expansion valve 15 for expanding the same to an evaporative pressure via the check valve 16 and is reduced in pressure and temperature, and is finally infused into the indoor heat exchanger 17.

Accordingly, the indoor heat exchanger 17 serves to take the heat from the air blown by the indoor fan 81 when the refrigerant, reduced in temperature and pressure at the expansion valve 15, passes through a plurality of pipes so that the room can be cooled. The indoor heat exchanger 17 now discharges the cooled air (cool wind) to the room for performing the cooling operation. The gaseous refrigerant from the indoor heat exchanger 17 is in turn fed to the compressor 61 to thereby repeat the cooling cycle as illustrated by solid-line arrows in FIG. 3.

When the cooling operation is performed as described in the foregoing, the outdoor temperature detecting means 50 detects the temperature (To) of the outside air drawn through the suction inlet 11 and outputs the same to the control means 40.

Next, at step S12, a discrimination is made as to whether the outdoor temperature (To) detected by the outdoor temperature detecting means 50 is above an overload reference temperature (Ta: approximately 40 degrees) pre-established at the control means 40, and if the outdoor temperature (To) is above the overload reference temperature (Ta) (in case of YES), flow proceeds to step S13, where the control means 40 outputs a wind amount control signal to the wind amount control motor driving means 90 in order to increase the wind amount of the air discharged through the discharging outlet 12 at the outdoor unit, thereby driving the control motor 92.

When the wind amount control motor 92 is driven, the worm 92b is rotated, to thereby rotate the control means 91.

When the control means 91 is moved backward toward the discharging outlet 12 the incident angle (θ1) is reduced, so that the wind amount of the air discharged through the discharging outlet 12 becomes increased (see FIG. 5).

Accordingly, the amount of the outside air drawn through the suction outlet 11 also becomes increased, to thereby increase the amount of the air heat-exchanged with the outdoor heat exchanger 14, so that no overload is applied to the compressor 61 and the outdoor heat exchanger 14.

Successively, at step S14, the room temperature (Tr) changing in the course of the cooling operation of the air conditioner is detected by the room temperature detecting means 45 and is output to the control means 40.

Accordingly, at step S15, a discrimination is made as to whether the room temperature (Tr) detected by the room temperature detecting means 45 is the same as the established temperature (Ts) input by the operation manipulating means 35, and if the room temperature (Tr) is not the same as the established temperature (Ts) (in case of NO), flow returns to step S14 because the cooling operation should be continuously carried out, and the room temperature (Tr) is continuously detected until the temperature (Tr) becomes the same as the established temperature (Ts) and operations subsequent to step S14 are repeatedly preformed As a result of the discrimination at step S15, if the room temperature (Tr) is the same as the established temperature (Ts), (in case of YES), flow advances to step S16 because the cooling operation should be stopped, where the compressor 61 and the outdoor fan 71 are stopped and the operation is completed.

Meanwhile, as a result of the discrimination at step S12, if the outdoor temperature (To) is not above the overload reference temperature (Ta), in other words, in case the load applied to the compressor 61 and the outdoor heat exchanger 14 is small (in case of NO), flow advances to step S17, where the control means 40 serves to output a wind amount control signal to the wind amount control motor 90 in order to decrease the wind amount of the air discharged through the discharging outlet 12 at the outdoor unit.

Accordingly, the wind amount control motor 90 receives the wind amount control signal output from the control means 40 to advance the control means 91 by driving the wind amount control motor 92.

When the wind amount control motor is driven, the worm 92b engaged with the rotary axis 92a of the control motor 92 is rotated, and the worm gear 91a is rotated in turn according to the rotary movement of the worm 92a, to thereby rotate the control means 91.

When the control means advances toward the front side, i.e., in the direction of the arrow in FIG.5, the incident angle (θ2) grows larger, thereby reducing the wind amount of the air discharged through the discharging outlet 12.

Accordingly, the amount of outside air drawn through the suction inlet 11 is decreased to thereby reduce frictional noises generated by the outdoor fan motor 72 and the outdoor fan 71, so that the generation of noises can be curbed during the night or during the need for silent operation of the air conditioner.

When the wind amount of the air discharged through the discharging outlet 12 is decreased at step S17, flow advances to step S14 and repeatedly performs the operations subsequent to step S14.

Although a cooling operation has been presented in the embodiment of the present invention, it should be noted that the present invention is not to be taken as limiting, and the same objects and effects can be accomplished even in the heating operation.

The only difference is that the refrigerant compressed to high temperature and high pressure by the compressor 61 flows through a cooling cycle which is formed along a dotted arrow head in FIG. 3 during the heating operation, which is a reverse direction from the cooling operation.

Furthermore, although the foregoing description of the embodiment has been disclosed where the control means 91 is disposed at an inner front side of the body of the outdoor unit, it should be noted that the present invention is not to be taken as limiting and the means can be arranged at a bottom floor of the body of the outdoor unit.

Still furthermore, although the foregoing description of the embodiment has been presented, where the control means 91 is moved by a worm gear the control means can instead be moved by way of a belt, chain or the like.

As is apparent from the foregoing, there is an advantage in that the air conditioner according to the present invention can adjust the wind amount of the air discharged from the outdoor unit according to changes of the outside temperature, to thereby adequately cope with load changes of the compressor and the outdoor heat exchanger, so that heating efficiency can be improved.

According to the present invention, there is another advantage in that the wind amount of the air discharged from the outdoor unit can be easily adjusted so that frictional noises generating by the outdoor fan and the fan motor can be reduced in the night or on the occasion calling for silent operation of the air conditioner for a pleasant environment.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An air conditioner, comprising:

a housing;

a heat exchanger in the housing for circulating a refrigerant;

a fan in the housing for circulating outside air across the heat exchanger;

a temperature sensor for sensing a temperature of the outdoor air;

a controller connected to the temperature sensor for determining a difference between the sensed outdoor air temperature and a reference temperature to determine in response to that difference, whether the heat exchanger is in an overload condition; and a flow-regulating mechanism connected to the controller for increasing an intensity of air flow produced by the fan when an overload condition is determined, the flow-regulating mechanism comprising a hollow cylinder in which the fan is coaxially disposed, the fan being movable axially relative to the fan to vary the intensity of the air flow.

2. The air conditioner according to claim 1 including wherein the flow-regulating mechanism includes a motor connected to the cylinder for moving the cylinder axially.

3. The air conditioner according to claim 2 wherein the flow-regulating mechanism includes a worm wheel connected to the cylinder, the motor being connected to the worm gear for rotating the worm wheel to move the cylinder axially.

4. The air conditioner according to claim 1 wherein axial movement of the cylinder changes an incident angle formed by first and second lines, the first line extending parallel to the axis and tangentially to a fan blade; the second line extending from an intersection of the first line and a fan blade and passing through a corner of the cylinder formed by an upstream end of an inner periphery of the cylinder.

5. The air conditioner according to claim 1 wherein the cylinder includes an external helical thread mounted in a wall of the housing whereby rotation of the cylinder produces axial movement of the cylinder, and further including a motor connected to the controller and cylinder for rotating the cylinder.

6. The air conditioner according to claim 1 wherein axial movement of the cylinder in a downstream direction with reference to air flow through the fan reduces the air flow intensity, and axial movement of the cylinder in an upstream direction increases the air flow intensity.

7. The air conditioner according to claim 1 wherein the housing includes an air discharge outlet, the cylinder being disposed upstream of the air discharge outlet with reference to the air flow through the fan.

* * * * *